(12) United States Patent
Poppe

(10) Patent No.: US 11,752,583 B1
(45) Date of Patent: Sep. 12, 2023

(54) WORKPIECE LOCATIONAL POSITIONER

(71) Applicant: Michael F. Poppe, Richmond, MI (US)

(72) Inventor: Michael F. Poppe, Richmond, MI (US)

( * ) Notice: Subject to any disclaimer, the term of this patent is extended or adjusted under 35 U.S.C. 154(b) by 113 days.

(21) Appl. No.: 17/509,434

(22) Filed: Oct. 25, 2021

(51) Int. Cl.
*B23Q 3/18* (2006.01)
(52) U.S. Cl.
CPC ................................. *B23Q 3/186* (2013.01)
(58) Field of Classification Search
CPC ...... B23Q 3/186; B21D 43/00; B21D 43/003; B21D 43/02
See application file for complete search history.

(56) References Cited

U.S. PATENT DOCUMENTS

| | | |
|---|---|---|
| 2,969,750 A | 1/1961 | Clark |
| 3,648,821 A | 3/1972 | Rudolph et al. |
| 4,779,336 A | 10/1988 | Inoue et al. |
| 4,846,056 A * | 7/1989 | Bond ..................... B21D 43/04 100/263 |
| 5,141,093 A | 8/1992 | Alexander |
| 6,918,280 B2 * | 7/2005 | Poppe ................... B23Q 7/006 72/426 |

* cited by examiner

*Primary Examiner* — Jason L Vaughan
*Assistant Examiner* — Amanda Kreiling

(57) ABSTRACT

A workpiece locational positioner apparatus that is compact for precisely positioning a workpiece from a position above a tool or fixture includes a cylinder assembly, a central (tip) cam plate adapted to convert the reciprocating motion of the cylinder assembly into a rotational motion, and an engagement package mounted to the cam plate, to accurately engage, position and locate the workpiece in the tool.

5 Claims, 10 Drawing Sheets

WORKPIECE LOCATIONAL POSITIONER

FIELD

The present disclosure is directed to a method and apparatus for use with a tool or fixture where a workpiece is inaccessible from beneath and requires gauge pin/pins to engage the workpiece from above. The method and apparatus relate to a workpiece locational positioner that is compact and inexpensive as compared to the use of an overhead ram or a combination lateral and vertical slide mechanism. By quickly and precisely locating the blank workpiece on the tool or fixture within a compact area, the apparatus allows work to be performed in the tool more efficiently thereby reducing total workpiece cycle time.

SUMMARY

According to the preferred embodiment of the present disclosure, there is provided a method and an apparatus for precisely positioning a workpiece from a position above a tool or fixture. More particularly, the method and apparatus relate to automatically and precisely locating a blank workpiece in a tool or fixture from above the fixture and in an efficiently and less congested manner reducing overall cycle time and maintenance while providing additional room to preform work to the workpiece while located in the fixture.

The apparatus may include a cylinder assembly, a central (tip) cam plate adapted to convert the reciprocating motion of the cylinder assembly into a rotational motion, and an engagement package mounted to the cam plate, to accurately engage, position and locate the workpiece.

The cylinder assembly may be actuated by any conventional apparatus including but not limited to pneumatics, hydraulics, or electro-mechanical servo motor. The cylinder assembly may include a cylinder or body portion and a piston rod that is mounted in the body portion of the cylinder and extends therefrom. The extending end of the piston rod has a centrally attached drive roller. The cylinder body may be rigidly and precisely mounted to a vertical mounting bracket that may be mounted to an intermediate plate that may be mounted to an angle bracket.

The apparatus may further include a pair of stationary guide plates symmetrically and precisely mounted to the vertical mounting bracket and to a pair of fixed rollers. According to the preferred embodiment, an intermediate plate member may be disposed between the vertical mounting bracket and the angle bracket to provide clearance for the cylinder. The cam (tip) plate may include a configuration of slots therethrough, which are orientated to facilitate the conversion of the reciprocating motion of the cylinder into translational and rotational or pivotal motion. A first slot of the slot configuration may be generally horizontal and is adapted to accommodate one of the drive rollers mounted on the piston rod. A second generally vertical slot may be adapted to accommodate one of the fixed rollers of the mounting plate. Additional slots may be adapted to accommodate additional fixed rollers that may be implemented to provide stability as required for a specific application.

When the workpiece locational positioner apparatus is in a steady state (or work) position, the drive rollers are positioned near the rearward most portion of the first slots and the fixed rollers are positioned near the top portion of the second slots. When the cylinder is actuated, the piston rod moves and the drive rollers extend in an upward direction. As the drive roller translates, the cam (tip) plate moves upward until the fixed rollers reach the bottom of their respective second slots. Thereafter, additional extension of the piston rod acts to rotate the cam (tip) plate about the fixed roller bottomed out in its slot. The initial upward translation of the cam plate is intended to disengage the workpiece locating pin from the workpiece such that it has enough clearance to release the workpiece from the locating pin whereas the rotation of the cam plate acts to transfer the workpiece locating pin and tooling to a retracted (or clear) position where the processed workpiece located in the tool or fixture may then be unloaded and or loaded.

A workpiece tool engagement portion of the workpiece location positioner apparatus is preferably mounted to the cam (tip) plate and is intended to be adaptable to accommodate a variety of different applications. In one embodiment, a plurality of adjustable locating pins and locating blocks may be positioned relative to the workpiece to precisely locate and position the workpiece in the tool or fixture relative to the X, Y & Z coordinate axes.

It is an object of the present disclosure to provide a workpiece location positioner apparatus adapted to automatically locate from above and clear, a workpiece previously loose state, precisely and accurately, in one continuous motion, allowing work to be performed concisely and accurately immediately. Also, after work is performed, the location positioner apparatus disengages workpiece tool gaging and workpiece locating gage pin and locating blocks and rotates them to a clear position in one continuous motion, thereby reducing the downtime and overall cycle time of the operation.

It is another object of the present disclosure that the apparatus be simple and economical. It is yet a further object of the present disclosure that the apparatus be compact such that it occupies minimal manufacturing space. These objects and other features, aspects, and advantages of the method and apparatus of the present disclosure will be more apparent after a reading of the following detailed description, appended claims, and accompanying drawings.

DETAILED DESCRIPTION

Figure 1:
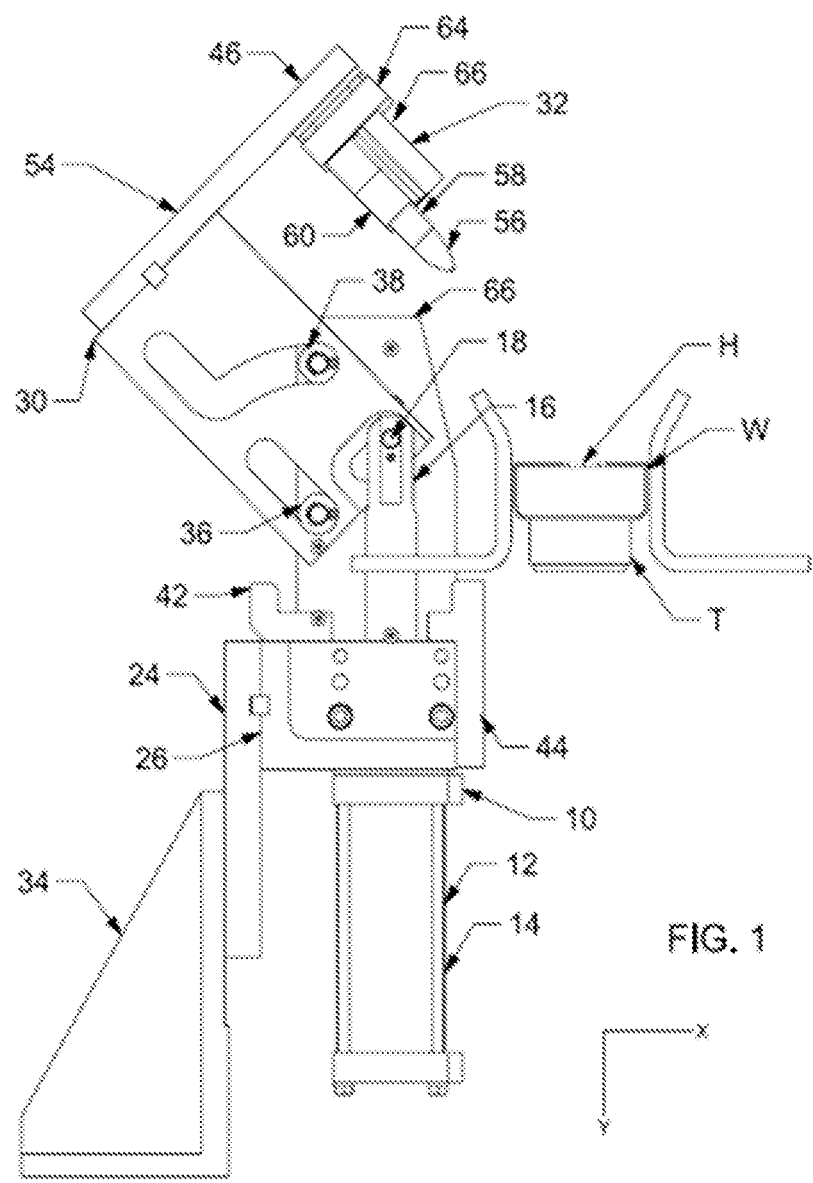
FIG. 1 is a side view of an apparatus according to one embodiment of the present disclosure wherein the apparatus is in an extended open (or clear) position.

Referring in general to the figures of the drawings and in particular to FIG. 1, there is shown a workpiece locational positioner apparatus 10 in accordance with the present disclosure. The workpiece locational positioner apparatus 10 may be adapted to automatically locate and position an unprocessed workpiece W to be located in a tool T for processing by the tool T.

Notably, the apparatus 10 contacts and locates the workpiece W from above using a gage hole H facing up on the workpiece W. The apparatus 10 is fully function using only one cylinder while eliminating the need for an overhead structure or any additional horizontal or vertical slides. The apparatus 10 of the present disclosure reduces downtime due to maintenance and improves the cycle time of the tool T thereby increasing its productivity and decreasing the unit cost of the processed workpiece W. After the workpiece W is processed in the tool T, the apparatus 10 may be operated to also remove the workpiece tool gaging 32 from the processed workpiece W and the tool T out to a retracted (clear) position 54 thereby allowing the processed workpiece W to be unloaded and a new unprocessed workpiece W to be loaded and the cycle repeated.

The apparatus 10 may include a cylinder assembly 12, a cam (or tip) plate 30 adapted to convert the linear, reciprocating motion of the cylinder into a rotational motion of the cam plate 30, a workpiece tool gaging portion 32 having workpiece locating pin 58 adapted to engage the unprocessed workpiece W loosely loaded into tool T (fixture).

Figure 2:
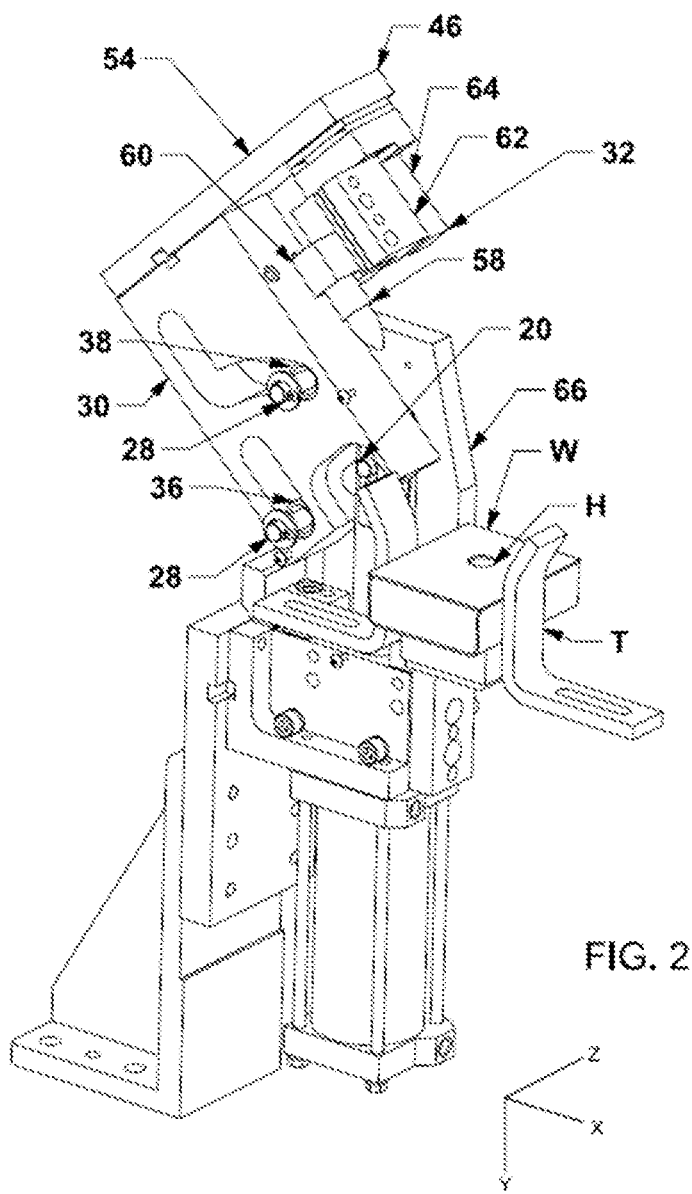
FIG. 2 is a perspective view of the apparatus of FIG. 1.

In the context of the following detailed description, including of the preferred embodiment, reference to the X, Y and Z coordinate axes, as well the relative terms forward/rearward (X), above/below (Y), and right/left (Z) should be applied from the perspective of the tool T using the workpiece locational positioner apparatus 10 as best shown in FIGS. 1 and 2.

Figure 3:
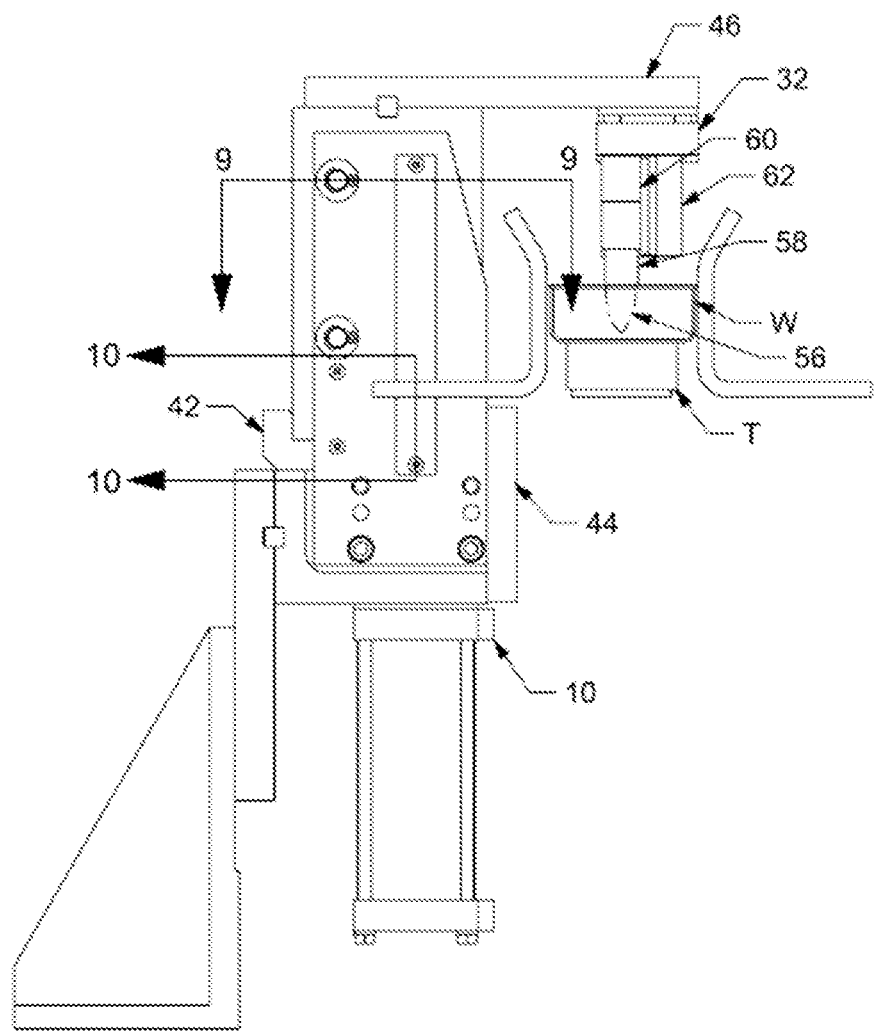
FIG. 3 is a side view of the apparatus of FIG. 1 in a retracted or closed position.
Figure 10:
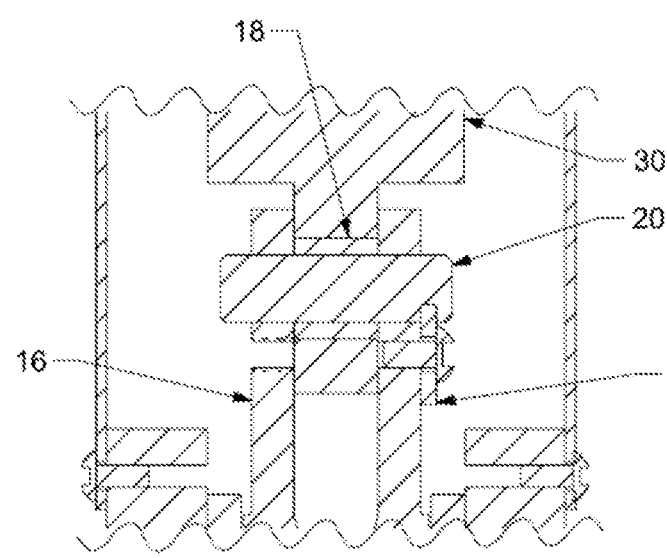
FIG. 10 is a partial, cross-sectional view taken along the 10-10 line of the apparatus of FIG. 3.

The cylinder assembly 12 may be powered or operated using any know or appropriate power generating device including hydraulically, pneumatically, or electro-mechanically. The cylinder assembly 12 may include a pneumatic, cylinder body portion 14 and a piston rod 16 that may be extended from and retracted into the cylinder body portion 14 using an available air source coupled to the cylinder body portion 14 (not shown). The piston rod 16 may have a generally rectangular or circular cross-section and may have a drive roller 18 attached to an exposed end portion of the piston rod 16. Referring specifically to FIG. 10, which is taken along the section line 10-10 in FIG. 3, a section through the drive roller 18 shows that drive roller 18 is mounted to an axle pin 20 that is disposed into holes through the exposed end of the piston rod 16. The axle pin 20 is coupled, attached, or secured by an axle pin retainer 22.

Referring again in particular to FIG. 1, the cylinder assembly 12 is rigidly mounted to a vertical mounting bracket 26 that is in turn attached to an angle plate 34. The angle plate 34 is commercially available in a variety of different configurations, and the height thereof is intended to vary depending upon the details of the specific application for the workpiece W and tool T. According to the preferred embodiment, an intermediate mounting plate 24 may be disposed between the vertical mounting bracket 26 and the angle plate 34 to provide clearance for the cylinder assembly 12, however it should be appreciated that the intermediate plate member 24 may be unnecessary in some applications.

Figure 7:
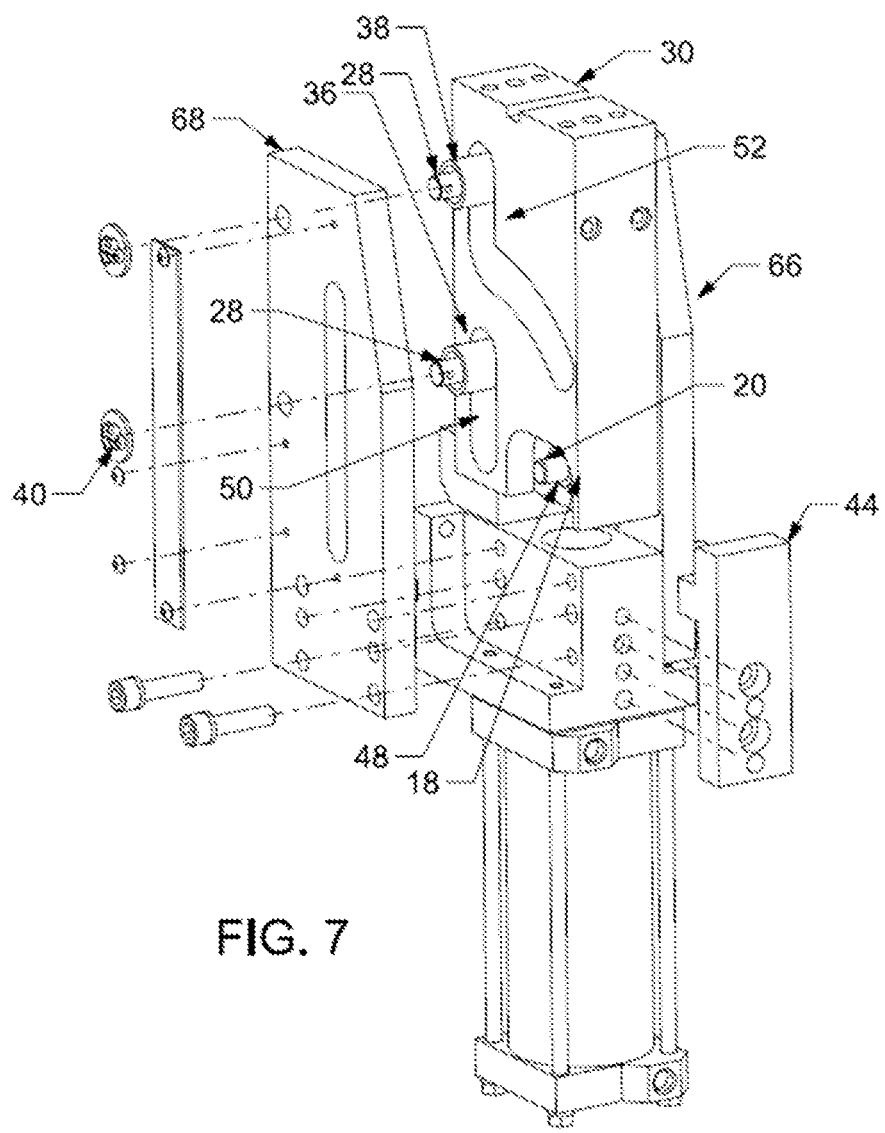
FIG. 7 is a partial, exploded, perspective view of the apparatus of FIG. 5.
Figure 8:
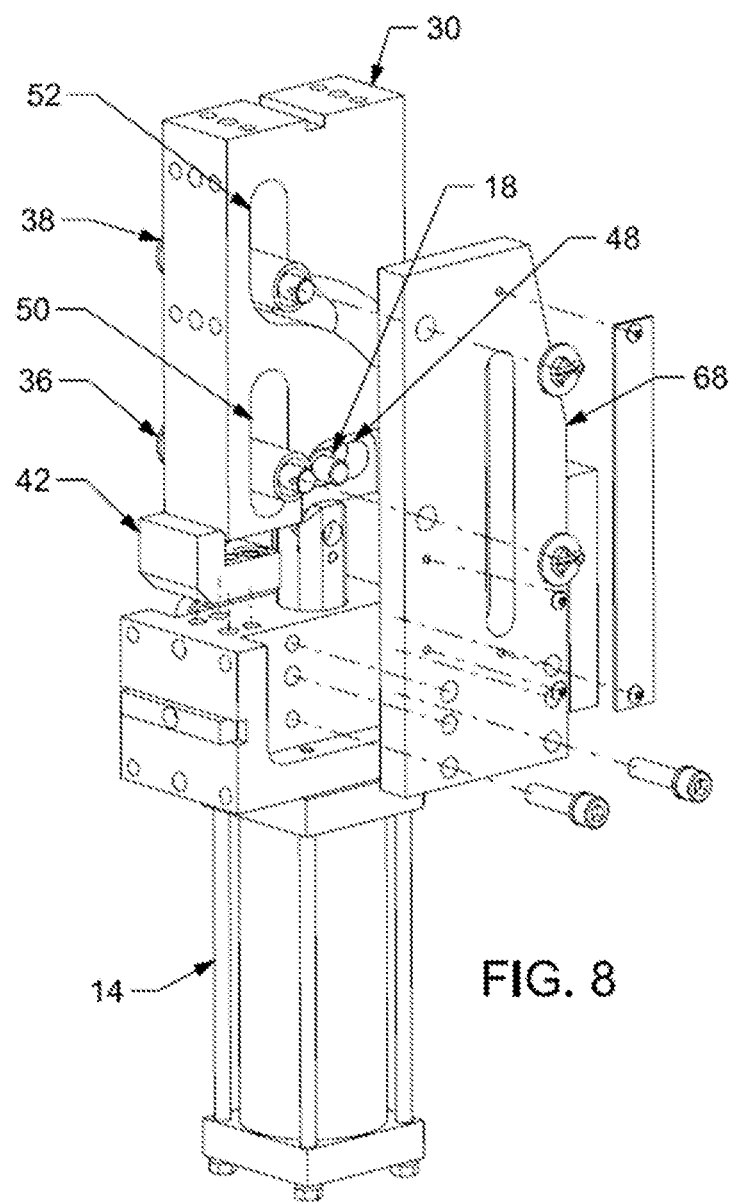
FIG. 8 is an alternate, exploded perspective view of the apparatus of FIG. 7.
Figure 9:
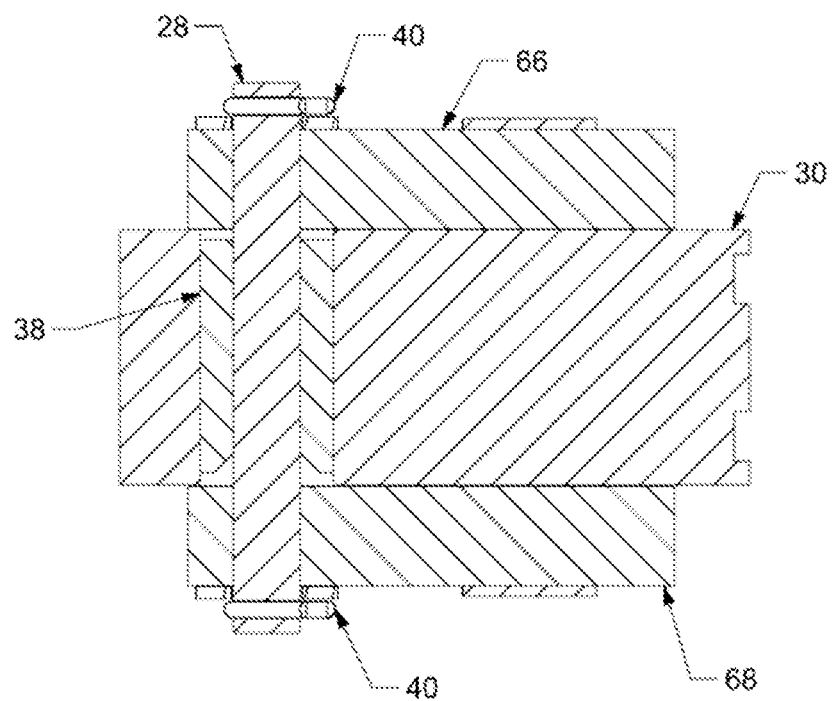
FIG. 9 is a partial, cross-sectional view taken along the 9-9 line of the apparatus of FIG. 3.

Referring now in particular to FIG. 7, the workpiece locational positioner apparatus 10 may further include vertical mounting plates 66 (left hand) and 68 (right hand) and may further include a pair of fixed rollers including the lower fixed roller 36 and an upper fixed roller 38. The fixed rollers 36, 38 are attached to the right and left vertical mounting guide plates 66 and 68, respectively, using axle pins 28 and cotter pins 40 as detailed in FIG. 9 which is taken along the line 9-9 in FIG. 3.

Referring again in particular to FIG. 1 the apparatus 10 may further include a rearward/downward positive seating block 42 is rigidly mounted to the angle mounting bracket 26. The apparatus 10 may further include a forward/downward positive seating block 44 rigidly, and distally in the X-direction from the rearward/downward positive seating block 42, mounted to the angle mounting bracket 26. As seen in FIG. 2, the apparatus may further include a tooling adapter plate 46 mounted to the cam plate 30. The cam plate 30 may include a plurality of slots orientated to convert the reciprocating motion of the cylinder assembly 12 into a rotational or tipping motion of the tooling adapter plate 46. The cam plate 30 may more particularly include three slots arranged in a predetermined configuration, but, however, it should be appreciated that the alternative embodiments having fewer slots, additional slots and/or different slot configurations are envisioned depending on the desired motion of the engagement portion of the workpiece W and the required limitations of removing the workpiece W from the tool T.

Figure 4:
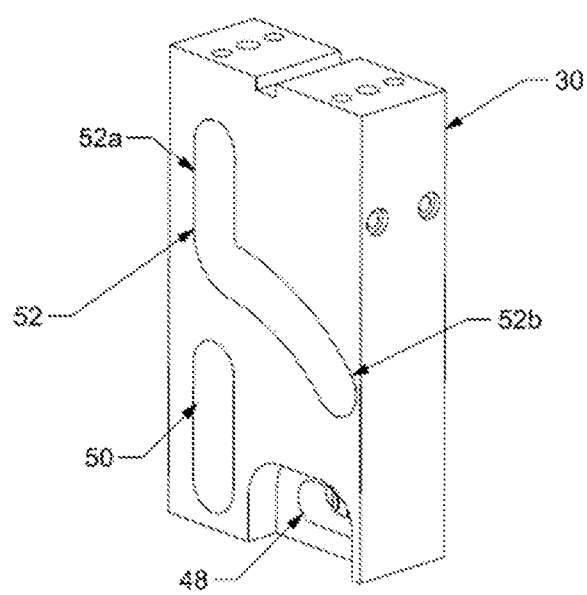
FIG. 4 is a partial, perspective view of a cam plate of the apparatus of FIG. 1.
Figure 5:
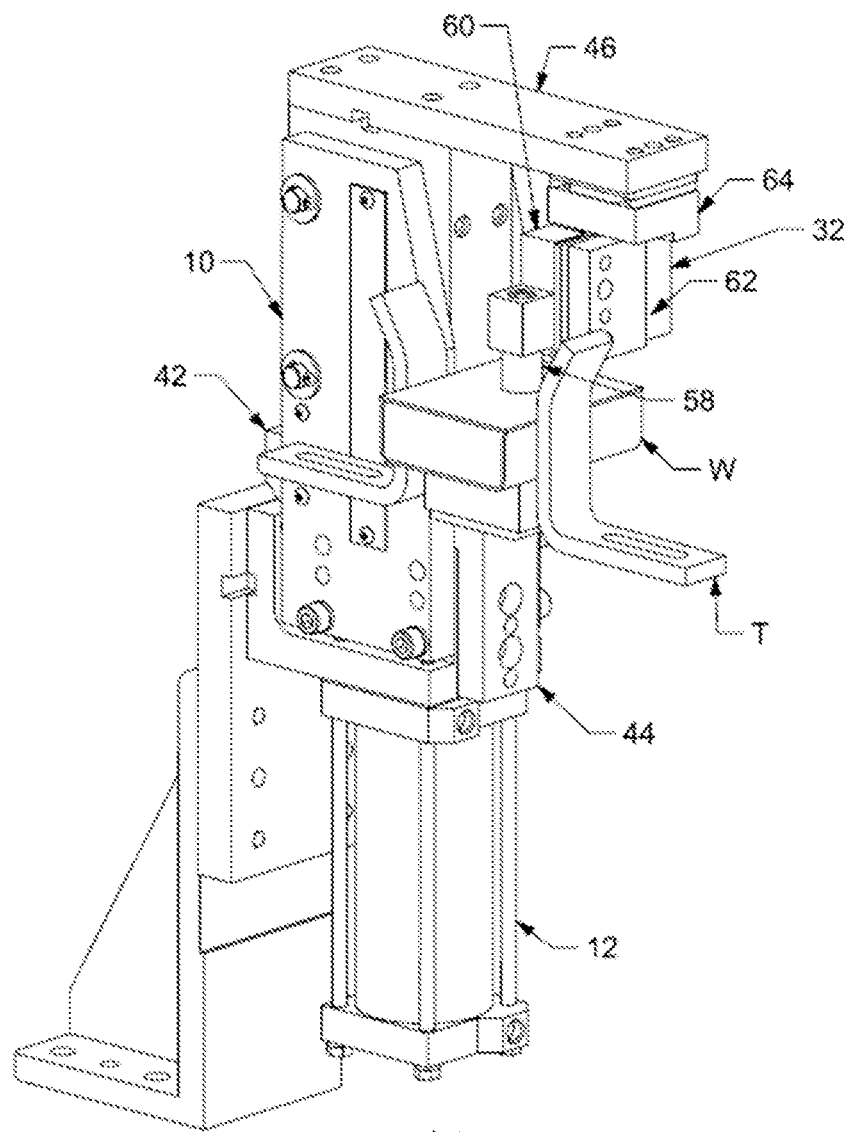
FIG. 5 is a front perspective view of the apparatus of FIG. 3.
Figure 6:
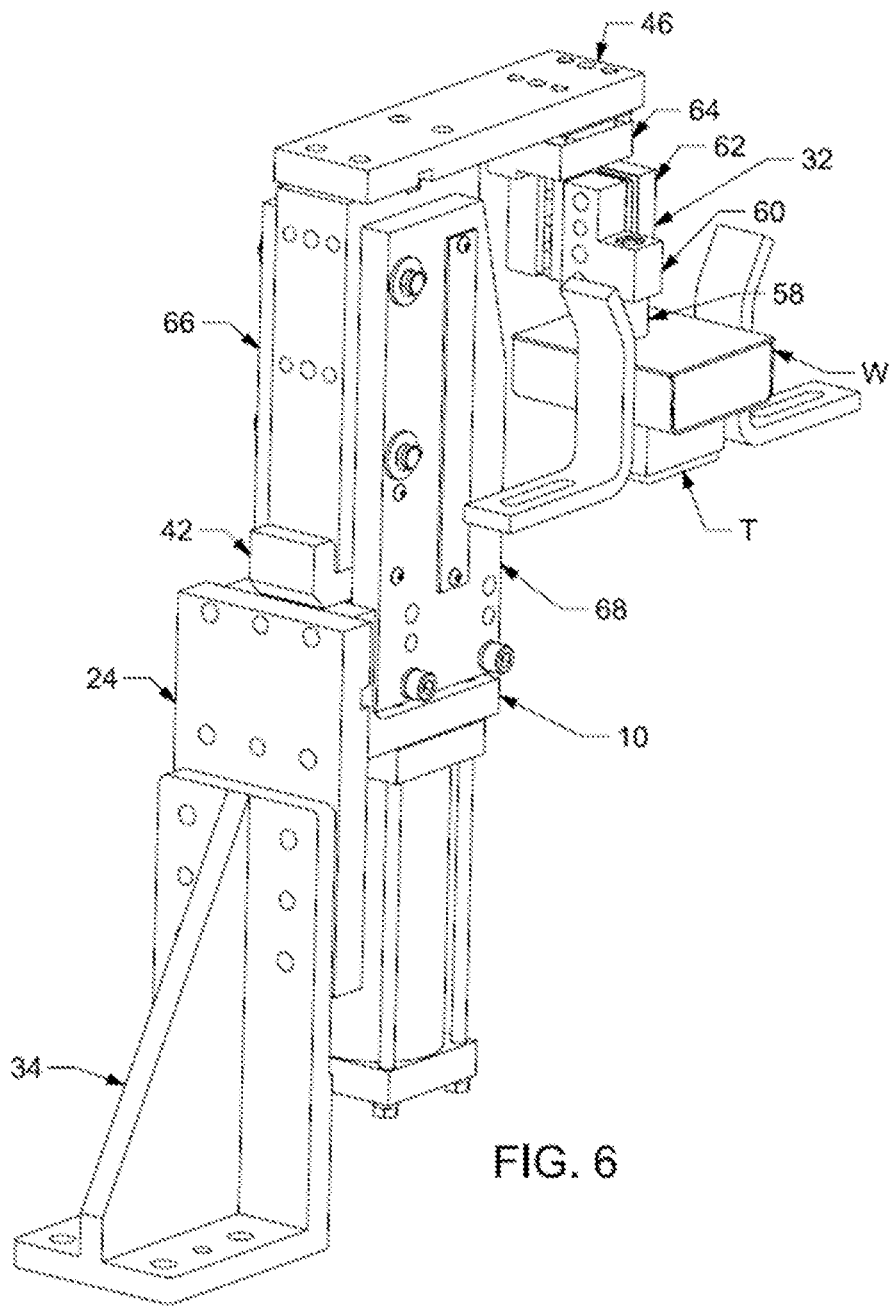
FIG. 6 is a rear perspective view of the apparatus of FIG. 3.

As best shown in FIG. 4, the cam plate 30 may include a first slot 48 extending generally horizontal (in the X-direction) and located proximal the bottom of the cam plate 30. A second slot 52 may be located above the first and third slots 48 and 50, respectively, and may include a first portion 52a that extends vertically in the Y-direction and is generally aligned with the third slot 50, and a second portion 52b extending therefrom in a downward and forward direction. A third slot 50 may optionally be located rearward relative to the first slot 48 and extends vertically in the Y-direction between a first end located above the first slot 48 to a second end located below the first slot 48. The third slot 50 is optional but provides additional stability such that its incorporation is preferred.

Referring in particular now to FIGS. 1, 2, 7, 8 and 10, the drive roller 18 is disposed within the first slot 48 of the cam plate 30. The lower fixed roller 36 is disposed within the third slot 50 of the cam plate 30. The upper fixed roller 38 is disposed within the second slot 52 of the cam plate 30. When the workpiece locational positioner apparatus 10 is in the work state position, as shown in FIGS. 3, 5, 6 and 7, the drive roller 18 is positioned near the rearward most portion of the first slot 48, the first fixed roller 36 is positioned near the top portion of the third slot 50, and the second fixed roller 38 is positioned near the top of the second slot 52.

As shown in FIGS. 1 & 2, when the cylinder assembly 12 is actuated, the piston rod 16 and drive roller 18 extend in an upward or Y-direction. The drive roller 18 translates the cam plate 30 upward until the first fixed (lower) roller 36 reaches the bottom portion of the third slot 50. Thereafter, additional extension of the piston rod 16 acts to rotate the cam plates 30 in a counterclockwise direction (i.e., (about the Z-axis) about the bottom portion of the third slot 50 while the second fixed roller 38 follows the second slot 52. The initial upward translation of the cam plate 30 disengages and lifts the workpiece locating gage pin 58 and the workpiece tool gaging 32 from the workpiece W such that the locating gage pin 58 and the workpiece tool gaging 32 have sufficient clearance from the workpiece W (shown in FIG. 1), whereas the rotation of the cam plates 30 acts to transfer the workpiece locating pin 58 and workpiece tool gaging 32 such that it has enough clearance to allow the processed workpiece W to be unloaded from tool T and a new unprocessed workpiece W loaded to tool T.

Full upward extension of the piston rod 16 acts to rotate the cam plate 30 by approximately 45° from horizontal which has been established to be an amount sufficient to ensure that in the case of the loss of power (regardless of the type of power used—i.e., pneumatic, hydraulic, electro-mechanical, etc.) in the retracted (or clear) position 54 as best shown in FIGS. 1 and 2, gravity will overcome and maintain the cam plate 30, workpiece tool gaging 32 and workpiece locating pin 58, in the retracted position 54, clear of the workpiece W resting in a free state in the tool T. Thereby allowing the processed workpiece W to be removed allowing room to load a new unprocessed workpiece W. Depending upon the application, the amount of cam plate 30 rotation may be increased or decreased by increasing or decreasing the stroke length of the piston rod 16 of the cylinder assembly 12. This may be desirable, for instance, in an application involving heavier or larger tool gaging 32 and keeping the center of gravity or creating additional clearance in the retracted (or clear) position 54. Additionally, the engagement portion 56 of a workpiece tool gage pin 58 may require additional stroke to disengage from the workpiece W. this can be achieved by increasing the stroke of the cylinder 12 and the length of the second cam plate slot 50 and the vertical portion of the third cam plate slot 52.

Referring again in particular to FIGS. 1, 2, 3, 5 & 6 the workpiece tool gaging portion 32 of the workpiece locational positioner apparatus 10 may be precisely mounted to a tooling adapter plate 46 and preferably includes a workpiece locating gage pin 58 rigidly and precisely mounted to a locating pin retainer block 60. The locating pin retainer block 60, may be precisely and rigidly mounted and adjustable (one adjustment type would be to use shims between the block 60 and the L Block 62) to a X-Z adjustable "L" block 62. The X-Z adjustable "L" block 62 may be precisely and rigidly mounted to and adjustable (also adjustable using shims for example) to a Y-Z adjustable "L" block 64. The Y-Z adjustable "L" block may be mounted precisely and rigidly to a tooling adapter plate 46. The tooling adapter plate 46 may be mounted precisely and rigidly to the cam plate 30 of the workpiece locational positioner apparatus. It should be appreciated that the workpiece locating gage pin 58 of the workpiece tool gaging 32 is adaptable and adjustable to accommodate a variety of different applications, and that the following disclosure merely represents a preferred embodiment of the present embodiments and should not be considered limiting.

The precise and adjustable attachment of the workpiece tool gaging 32 (described in previous paragraph) disclosed hereinabove, of the locational positioner apparatus 10, may provide precise locational adjustment in the Z direction (left-right) and the X adjustment (forward-rearward) through X-Z adjustable "L" block 62. The precise and adjustable attachment of the workpiece tool gaging 32 may provide precise locational adjustment in the Y direction (up-down) through the Y-Z adjustable "L" block 64, relative to the X, Y and Z coordinate axes. It should be noted that all of the above attachments (whether adjustable or not) will necessarily include industry standard geometrical dimensioning and tolerances to be usable for handling and processing the workpiece W consistent with the workpiece's W specifications and requirements thereby positioning and locating the workpiece W precisely. It should be appreciated that the configuration of the workpiece tool gaging 32 disclosed herein is merely one embodiment and that alternative embodiments are readily understood from the disclosure. For example, it is envisioned that the engagement portion 56 may be application specific for a particular tool. For example, the workpiece tool gaging 32 can be arranged to accommodate specific X, Y and Z coordinate axes requirements that may have unique and different industry standard geometrical dimensioning and tolerances for different workpieces.

Referring now in particular to FIGS. 3, 5 and 6-8, when the cylinder assembly 12 is retracted in a work position as shown, the piston rod 16 and roller 18 retract in a downward direction and the drive roller 18 translates the cam plate 30 downward until the bottom machined hardened surface of the cam plate 30 is resting and firmly seated, and located in the X and Y directions into the rearward/downward seating block 42 and the forward/downward seating block 44. In one embodiment, the cylinder assembly 12 and the apparatus 10 continuously provide and maintain a downward force throughout the work process cycle. The two vertical mounting plates 66 and 68 are mounted to each side machined surface of the angle mounting bracket 26 allowing for a precise and rigid surface to locate the cam plate 30 in the Z (left-right) direction to provide sufficient accuracy in the location of the tooling adapter plate 46 and the workpiece tool gaging 32 maintaining the precise position and location of the workpiece locating gage pin 56.

As shown in FIGS. 1 & 2, when the cylinder assembly 12 is actuated, the piston rod 16 and drive roller 18 retracts in a downward or Y-direction. The drive roller 18 continues to be retracted as the cylinder body retracts the piston rod 16, it translates the cam plate 30 downward until the drive roller 18 reaches the rearward portion of the first slot 48 in the cam plate 30. Refer also to FIGS. 1, 4 and 7. The drive roller 18 translates the cam plate 30 downward until the upper fixed roller 38 reaches the upper portion of the second slot 52 in the cam plate 30. While the lower fixed roller 36 follows the third slot 50 and acts to rotate the cam plate 30 in a clockwise direction about the Z-axis at the bottom portion of the third slot 50. While the upper fixed roller 38 continues to follow the third slot 52, through the initial vertical path until it will engage the engagement portion 56 of the workpiece locating gage pin 58 into the workpiece gage hole H of the unprocessed workpiece W.

While the present disclosure has been described in terms of various and a preferred embodiment, it will become apparent that other forms could be adopted by one skilled in the art. The disclosure and teachings of the present application are intended to encompass any reasonable substitutions or equivalents. For example, the structure, materials, sizes, and shapes of the individual components could be modified, or substituted with other similar structure, materials, sizes, and shapes. Those skilled in the art will appreciate that other applications, including those outside of the automotive industry are possible. Accordingly, the scope of the present patent is to be limited only by the following claims.

What is claimed is:

1. A workpiece locational positioner apparatus for automatically and precisely loading an unprocessed workpiece into a tool, the apparatus comprising:
  a. a base;
  b. a cylinder attached to the base, the cylinder having one end retracted in the cylinder and an opposite end extending therefrom;
  c. a cam tip plate pivotably connected to the opposite end of the piston rod, the cam tip plate having a plurality of slots adapted to translate the cam tip plate in response to the initial extension of the piston rod and thereafter rotate the cam tip plate in response to further extension of the piston rod;

d. a tooling adapter plate mounted precisely and rigidly to the cam tip plate;
e. a Y-Z adjustable "L" block precisely and rigidly mounted to the tooling adapter plate;
f. a X-Z adjustable "L" block precisely, rigidly and adjustably mounted to the Y-Z adjustable "L" block;
g. a locating pin retainer block precisely, rigidly and adjustably mounted to the X-Z adjustable "L" block;
h. a workpiece tool gaging portion mounted to the X-Z adjustable "L" block;
i. a workpiece locating gage pin rigidly and precisely mounted to the locating pin retainer block;
j. wherein the workpiece tool gaging portion accommodates specific X, Y and Z coordinate axes; and
k. thereby reducing equipment motions to locate an unprocessed workpiece into the tool and thereby the location of the workpiece in the tool is set and the overall cycle time of the operation is reduced.

2. The apparatus of claim 1 further comprising a pair of fixed rollers each disposed within one of the plurality of slots of one of the pair of cam plates.

3. The apparatus of claim 2, wherein the piston rod further comprises a pair of drive rollers each disposed within another of the plurality of slots of one of the pair of cam plates.

4. The apparatus of claim 1, wherein the cylinder is pneumatically actuated.

5. The apparatus of claim 1, wherein the cylinder is hydraulically actuated.

* * * * *